United States Patent [19]

Mallary

[11] Patent Number: 4,695,351

[45] Date of Patent: Sep. 22, 1987

[54] METHOD FOR PRODUCING MAGNETIC HEADS

[75] Inventor: Michael L. Mallary, Berlin, Mass.

[73] Assignee: Digital Equipment Corporation, Maynard, Mass.

[21] Appl. No.: 884,013

[22] Filed: Jul. 10, 1986

[51] Int. Cl.$^4$ .............................................. C25D 5/02
[52] U.S. Cl. ................................................... 204/15
[58] Field of Search ................................ 204/15, 38.4

[56] References Cited

U.S. PATENT DOCUMENTS 4,242,710 12/1980 Hempstead ........................ 360/113

Primary Examiner—T. M. Tufariello
Attorney, Agent, or Firm—William E. Cleaver

[57] ABSTRACT

The present technique involves the procedure of depositing magnetic material onto a substrate while subjecting the magnetic material, as it is deposited onto the substrate, to a magnetic bias field whose Oersted value is sufficient to substantially saturate the surface of the magnetic material in order to induce a state of uniaxial anisotropy.

6 Claims, 5 Drawing Figures

METHOD FOR PRODUCING MAGNETIC HEADS

BACKGROUND OF THE INVENTION

It has been determined that the key to high magnetic permeability at high frequency is to have the direction of "easy" magnetization in a magnetic yoke and in a return member (in the read head) lying perpendicular to the direction in which flux from the magnetic medium, (i.e. floppy disk, hard disk, drum, or the like) carrying the information, traverses the yoke and return member. It has been determined that flux or a flux movement can be transferred along the yoke and return member by partial rotation of flux vectors which lie in the direction of the easy axis. The foregoing is possible if the flux being conducted is small compared to the saturation flux of the yoke because the domain walls will not have to move in response to the high frequency flux input from the recording medium. If, indeed, the yoke is not saturated fluxwise in the easy direction and magnetic flux switching necessitates domain wall motion, then the read head will be inefficient and unable to accommodate high frequency switching. If high frequency switching cannot be accommodated then the information packing, in bits per inch, must be reduced. The present technique comes into being as an improvement in fabricating yokes and return members of a read head which accommodate small widthwise tracks. In the prior art there has not been a recognition that the demagnetization forces increase, comparatively speaking, as the pole region of a yoke becomes narrower.

SUMMARY OF THE INVENTION

The improved technique described herein is based on analytical studies and experimentation which shows that as the pole section of the yoke, of a magnetic read head, is reduced in width its demagnetization force is increased for a given thickness of the yoke. Therefore the bias field that must be present during deposition (in order to induce uniaxial anisotropy and thus transversely oriented domains and good high frequency performance) must be increased as the width of the pole is decreased in order to overcome this increase in the demagnetizing field. As a specific example consider the demagnetizing field at the top corner (worst case) of a two pole permalloy structure with a width of 10 microns, a total thickness of 6 microns, and an average saturation magnetization of 10,000 gauss. When this structure is saturated in the width direction, the demagnetizing field at the corner is 3360 gauss. Therefore the bias field during deposition should be set at a value that exceeds 3360 gauss in order to guarantee complete induced magnetic anisotropy at this point. If next we consider a second read head yoke of similar permalloy structure but which is only 5 microns in width, we find that to overcome the demagnetization forces it is necessary to subject the second yoke to at least 3900 gauss. It is the recognition of the foregoing inverse width—demagnetization requirement that provides the basis for the present technique.

The objects and features of the present invention will be better understood in view of the following description taken in conjunction with the drawings wherein.

Figure 1:
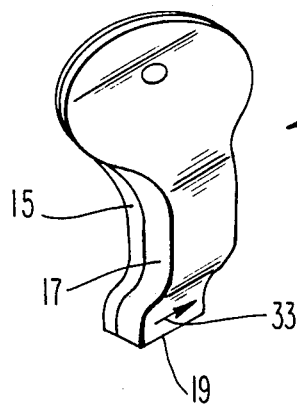
FIG. 1 depicts a typical magnetic read head yoke.

Consider FIG. 1. In FIG. 1 there is shown a typical top half yoke 11 which is principally formed of magnetic material such as permalloy. To form this top half yoke 11 there is deposited a thin layer (300 angstroms) of chromium 17. On top of the chromium layer there is sputter deposited a layer of permalloy and thereupon there is plated a layer of permalloy. The layer of chromium is a non magnetic layer and hence the magnetic flux path lies in the last layer of material to be deposited. With well known photographic techniques a mask of photo resist is laid out on the sputtered permalloy and the classical pattern of the pole piece to be formed is plated through the mask. The sputtered permalloy upon which the plated permalloy is to be deposited serves as a cathode in a plating bath while a carbon electrode serves as the anode. The system employs well known techniques to deposit, through an electroplating bath, the second layer of permalloy. In FIG. 1 the layer 15 represents both of the layers of permalloy, deposited on the chromium layer 17. The yoke 11 is employed as part of a flying head and the end 19 of the yoke 11 is at the air bearing surface which enables the read head to "fly over" the recording medium surface. This air bearing surface is formed by machining the substrate after the yoke has been formed.

Figure 2:
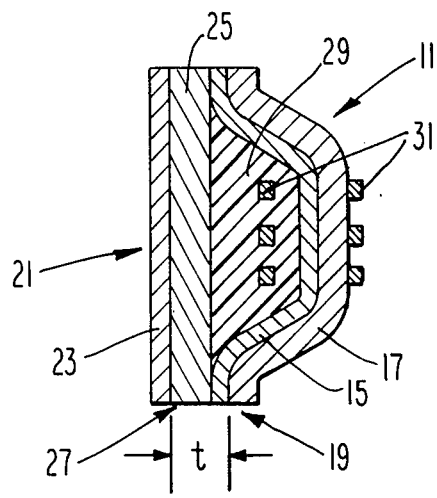
FIG. 2 depicts the arrangement of the yoke as one pole piece and the return member as the second pole piece.

FIG. 2 depicts a side view of a read head using the yoke 11. In FIG. 2 there is shown a magnetic flux return member 21. The return member 21 is made up of three layers which are respectively, chromium, sputtered permalloy, and plated permalloy. The second and third layers, i.e., the sputtered and plated permalloy layers are shown as layer 25. The permalloy layers, i.e., layer 15 and layer 25 provide a closed magnetic flux path from the air bearing surface 19 of the yoke 11 to the air bearing surface 27 of the flux return member 21. In FIG. 2 there is depicted a segment of hard baked photo resist 29 which is an organic, non magnetic electrical insulating material in ceramic layers. Other forms of electrical insulation material can be used. As can be gleaned from FIG. 2, there is embedded in the hard baked photo resist 29, a coil 31 shown in section. The coil 31 provides a means to detect a change of flux which in turn enables a read head to provide a read out signal, as is well understood in the art.

If we consider once again the plating operation it should be understood that the return member 21 and the yoke 11 are placed and held in the plating solution such that the air bearing surfaces (which are actually formed later in the process), respectively, surfaces 27 and 19, as well as the gap in between, are oriented parallel to a magnetic biasing field. Accordingly the induced magnetization in the yoke 11 and in the return member 21, resulting from the biasing field, is oriented as shown by the arrow 33 (FIG. 1) and is oriented into the drawing of FIG. 2. As will be discussed in detail below, the magnetic biasing field is at least the value given by Equation (2) below, in a preferred embodiment. By biasing the permalloy layer with at least the strength determined by Equation (2), we have found that the demagnetization fields of narrow pole pieces can be sufficiently overcome and the permalloy surface sufficiently saturated in the easy axis during deposition to provide uniaxial anisotropy.

Figure 3:
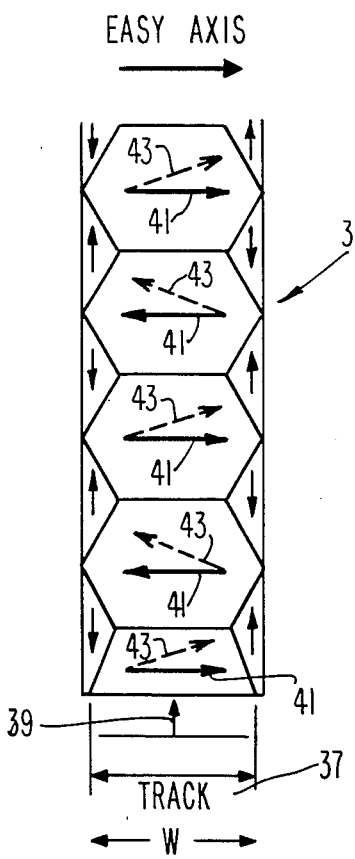
FIG. 3 depicts the domain wall structure in a pole piece which has been saturated in the "easy" axis direction.

Consider FIG. 3 which shows the pole piece section of the yoke 11. FIG. 3, in particular, shows a plated permalloy layer 35. When the permalloy layer 35 has been deposited by electroplating, as described above, in the biasing field determined by Equation (2) below, the permalloy layer is magnetized as shown in FIG. 3 after removal from the biasing field. Note the domain pattern with large domains oriented in the easy axis direction and triangular edge domains oriented in the hard axis direction. If the permalloy surface were less than sufficiently saturated (magnetically) during plating then the edge domains would occupy a greater section of the pole piece. In the arrangement shown in FIG. 3 when flux leaves the recording medium 37, it passes into the permalloy layer 35. In response to the flux 39 passing into the permalloy 35, the flux vectors 41 are partially rotated as shown by the dashed line arrows 43. Because the flux can be transferred through the permalloy layer (not only in the yoke 11 but also in the return member 21) by partial rotation of the flux vectors as compared to moving domain walls, the flux rapidly passes through a magnetic read head such as that shown in FIG. 2.

The main concern then is to cause the top surface of the plated permalloy layer to get into a state of sufficient magnetic saturation during plating in order to induce magnetic anisotropy in the top surface and to thus obtain a favorable domain pattern for the read back application of the head (as shown in FIG. 3). By theoretical analysis and empirical confirmation, we have found that the smaller the width the greater the demagnetization field. This relationship is expressed by the following Equation (1)

$$H_{demag} = Ms(90° + TAN^{-1} (T/W))/360° \qquad \text{Eq. (1)}$$

Where:
$H_{demag}$ = The demagnetizing field at the corner in Oersteds when the structure is completely saturated in the width direction.
Ms = Average saturation flux density in gauss (10,000 gauss for permalloy with no gaps).
T = Maximum structure thickness obtained during plating (in microns).
W = The pole structure width (in microns).
$TAN^{-1}$ = Inverse tangent function in degrees.

If the bias field during plating exceeds the value of $H_{demag}$ given by Equation (1) then the top surface of the structure being plated will be fully saturated in the transverse (easy) direction. The foregoing will result in maximum induced anisotropy and therefore a minimum triangular edge domain size (see FIG. 3) in the completed yoke structure. Therefore the best high frequency performance is obtainable for the bias field value determined from Equation (1). However due to the formation of "spike domains," in response to bias fields which are less than the Equation (1) value, substantial amounts of pole material is aligned with the biasing field. Spike domains occur when part of the center domains as shown in FIG. 3 are oriented north-south while part of the center domains are oriented south-north. Experimentally I have found that at least 50% of the pole material is aligned with the biasing field if the bias field is only $\frac{1}{4}$ of the value determined by Equation (1). Theoretical studies on the response to $\frac{1}{4}$ of the bias field value determined by Equation (1) indicates that 75% of the top surface of the pole is aligned with the bias field. The alignment of top surface is critical because that is where deposition takes place. Therefore to obtain sufficiently high induced anisotropy, only one fourth of the bias field determined by Equation (1) is required. This adequate bias field value is determined by Equation (2)

$$H_{ad} = H_{demag}/4 = Ms (90° + TAN^{-1} (T/W)/1440° \qquad \text{Eq. (2)}$$

The factor of a reduction by four of the $H_{demag}$ of Equation (1) has a significant economic impact. As is well understood the higher the biasing field that is required, the more expensive is the plating procedure. By operating with the knowledge of Equation (2), we have produced read heads that operate as though they had been subjected to a biasing field determined by Equation (1) but in fact have cost far less to produce.

Figure 4:
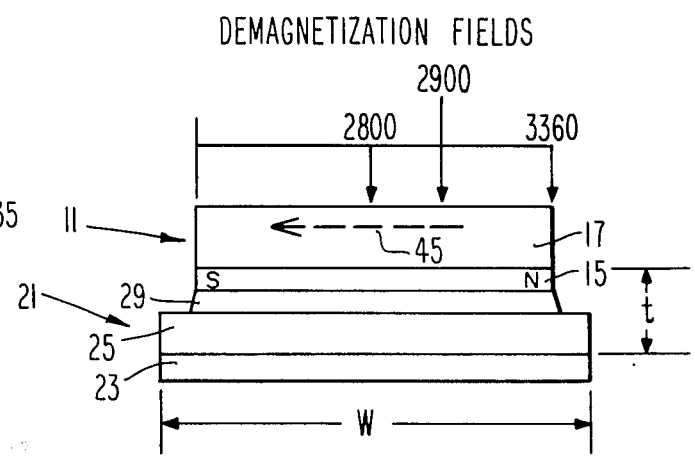
FIG. 4 shows the relationship of demagnetization forces along the width of a pole piece.

As an example of the application of Equation (1) consider the pole geometric shown in FIG. 4. The numbers identifying the permalloy layers, substrates and insulation segment are the same as in FIG. 2 and FIG. 5. The permalloy layer 15 of FIG. 4 is exaggerated, but is meant to represent 10 microns in width and the demagnetization fields are as shown. The demagnetization field within the permalloy layer 15 is in the direction of the dashed arrow 45. The values of the demagnetization fields in Oersteds along the width of the yoke at the top surface are shown in FIG. 4 for a fully saturated pole structure. This demagnetizing field varies from 2800 Oersteds in the center of the top surface to 3360 Oersteds at the corner. If a bias field of 3360 Oersteds is applied, the top surface will be fully saturated with about 200 Oersteds to spare. This is due to the subsaturated condition of the left and right walls of the structure. The foregoing application to the top surface produces slightly less demagnetizing field at the top surface then would occur if the pole structure per se were fully saturated. The foregoing condition has been verified with finite element computer calculations. Accordingly, it becomes apparent that the bias field determined from Equation (1) is about 6.5% more Oersteds than is necessary for effectively saturating the top surface.

Figure 5:
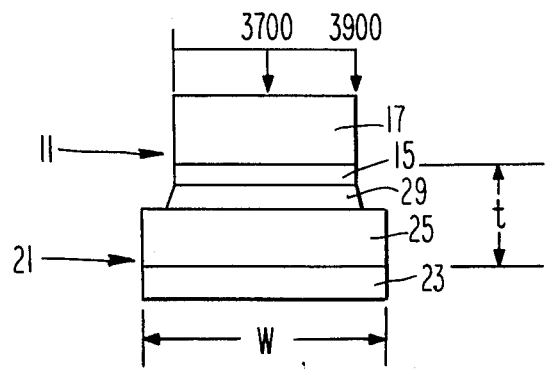
FIG. 5 shows the relationship of demagnetization forces along the width of a pole piece which is more narrow than the pole piece of FIG. 4.

In FIG. 5 the yoke 11 has a width which is meant to represent 5 microns. The permalloy layer 15 of FIG. 5 requires 3900 gauss to effectively saturate the surface layer and to provide the greatest reduction in triangular edge domains after plating (see FIG. 3). We determined that if the read head is to read more than 1500 tracks per inch that we could, with a large margin of safety, subject the permalloy layer to 5000 gauss during the electroplating of the permalloy layers onto the yoke and the return member. By flux biasing the permalloy layer in a biasing field of 5000 gauss, then all such yokes will be effectively saturated and will accommodate high frequency read outs even though the width of such read heads are in the order to 5 to 10 microns.

I claim:

1. A process for fabricating a yoke member with a magnetic flux conducting path for a high frequency switching magnetic read head comprising the steps of:
    (a) forming a mask means on a suitable electricity conducting base;
    (b) electroplating a layer of magnetic flux permeable material through said mask means onto said electricity conducting base; and
    (c) subjecting said layer of magnetic flux permeable material, during said electroplating step, to a biasing magnetic flux field having a value which is not less than $H_{demag}/4$ where $H_{demag}$ is determined by the following equation:

$$H_{demag} = Ms(90° + TAN^{-1}(T/W))/360°$$

where:

$H_{demag}$ = The demagnetizing field at the corner in Oersteds when the structure is completely saturated in the width direction, Ms = Average saturation flux density in gauss (10,000 gauss for permalloy with no gaps), T = Maximun structure thickness obtained during plating (in microns), W = The pole structure width (in microns), $TAN^{-1}$ = Inverse tangent function in degrees, (d) forming said electricity conducting base with said electroplated layer of magnetic flux permeable material thereon into a yoke member to be used as part of said high frequency switching magnetic read head.

2. A process according to claim 1 wherein said forming of a mask means includes the step of forming a mask defined by photo resist material.

3. A process according to claim 1 wherein said yoke member is formed to have a pole section whose width is substantially equal to the width of a track on a recording medium with which said high frequency switching magnetic read head is used and wherein said biasing magnetic flux field is held parallel to the width of said pole section.

4. A process according to claim 1 wherein said magnetic flux permeable material is permalloy and wherein said biasing magnetic flux field is at least 5000 gauss.

5. A process according to claim 3 wherein said width of said pole section is in the range of 5 to 10 microns and wherein said biasing magnetic flux field is at least 5000 gauss.

6. A yoke device to be part of a high frequency switching magnetic read head wherein said magnetic read head is designed to read in excess of 1500 tracks per inch comprising in combination: non-magnetic flux permeable substrate means formed to have a pole section whose width is in the 5 to 10 micron range; a layer of magnetic flux permeable material means secured by electrodeposition to a face of said substrate; said flux permeable material means being subjected to a biasing magnetic flux during electrodeposition having a value of not less than $H_{dmag}/4$ where $H_{dmag}$ is defined by:

$$H_{dmag} = Ms(90° + TAN^{-1}(T/W))/360°$$

where:

$H_{demag}$ = The demagnetizing field at the corner in Oersteds when the structure is completely saturated in the width direction, Ms = Average saturation flux density in gauss (10,000 gauss for permalloy with no gaps), T = Maximum structure thickness obtained during plating (in microns), W = The pole structure width (in microns), $TAN^{-1}$ = Inverse tangent function in degrss so that the surface is substantially in a state of magnetic saturation so as to induce an easy axis parallel to said width of said pole piece.

* * * * *

UNITED STATES PATENT AND TRADEMARK OFFICE
Certificate

Patent No. 4,695,351                                                                     Patented: Sept. 22, 1987

On petition requesting issuance of a certificate of correction of inventorship pursuant to 35 U.S.C. , it has been found that the above-identified patent, through error and without any deceptive intent, improperly sets forth the inventorship. Accordingly, it is hereby certified that the correct inventorship of this patent is:
Michael L. Mallay and Alan Lee Sidman.

Signed and Sealed This 9th Day of January 1990.

JOHN F. NIEBLING

*Supervisory Primary Examiner*
*Patent Examining Group 110*